United States Patent [19]
Schmaling et al.

[11] Patent Number: 5,562,416
[45] Date of Patent: Oct. 8, 1996

[54] HELICOPTER ROTOR BLADE MOUNTING ASSEMBLY

[75] Inventors: David N. Schmaling, Oxford; Frederick J. Knapp, Jr., Milford; Timothy A. Krauss, Harwinton, all of Conn.

[73] Assignee: Sikorsky Aircraft Corporation, Stratford, Conn.

[21] Appl. No.: 512,689

[22] Filed: Aug. 10, 1995

[51] Int. Cl.$^6$ .................................................. B64C 27/38
[52] U.S. Cl. ........................................ 416/134 A; 416/140
[58] Field of Search .......................... 416/134 R, 134 A, 416/140, 141

[56] References Cited

U.S. PATENT DOCUMENTS

| | | | |
|---|---|---|---|
| 3,761,199 | 9/1973 | Ferris et al. | 416/134 |
| 4,540,340 | 9/1985 | Pariani | 416/140 A |
| 4,568,244 | 2/1986 | Wehnert et al. | 416/134 |
| 4,568,245 | 2/1986 | Hibyan et al. | 416/134 |
| 4,568,246 | 2/1986 | Hibyan et al. | 416/134 |
| 4,585,393 | 4/1986 | Hibyan et al. | 416/134 |
| 4,652,210 | 3/1987 | Leman et al. | 416/140 A |
| 4,690,616 | 9/1987 | Hahn et al. | 416/140 A |
| 4,930,983 | 6/1990 | Byrnes et al. | 416/134 |
| 5,007,799 | 4/1991 | Mouille et al. | 416/140 A |
| 5,059,094 | 10/1991 | Robinson et al. | 416/134 A |
| 5,116,209 | 5/1992 | Anglade et al. | 416/140 A |
| 5,141,398 | 8/1992 | Bietenhader et al. | 416/140 A |
| 5,267,833 | 12/1993 | Mouille | 416/134 A |
| 5,340,279 | 8/1994 | Cycon et al. | 416/134 A |

OTHER PUBLICATIONS

Paper No. 62—Seventh European Rotorcraft and Powered Lift Aircraft Forum R & D On Composite Rotor Blades at Agusta (In particular, pp. 62–68, fig. 1) By: V. Giavotto, V. Caramaschi, G. C. Maffioli Sep. 8–11, 1981.

Primary Examiner—John T. Kwon
Attorney, Agent, or Firm—Brian A. Collins

[57] ABSTRACT

A mounting assembly (50) for mechanically interconnecting a helicopter rotor blade (12) to a rotor hub assembly (10) and for mechanically interconnecting the rotor blade (12) to a damper assembly (52) and a pitch control input assembly (54). The rotor hub assembly (10) includes a hub plate (16) having a hub plate aperture (22) for mounting a rotor assembly yoke (24). The rotor assembly yoke (24) includes upper and lower radially extending arms (28a, 28b) which are disposed above and below the hub plate (16) and which include a set of mounting apertures (29) formed through the proximal end thereof. The mounting assembly (50) includes upper and lower clevis arms (60a, 60b) formed at the root end (56) of the rotor blade (12), a horn/damper fitting (64) interposed between the upper and lower clevis arms (60a, 60b), and upper and lower spacer plates (90a, 90b) disposed between the clevis arms (60a, 60b) and the radially extending arms (28a, 28b) of the rotor assembly yoke (24). The horn/damper fitting (64) includes first and second end portions (66, 68) which are configured for mounting to the damper assembly (52) and the pitch control input assembly (54). First and second sets of aligned apertures (102, 112) are formed in the upper and lower clevis arms (60a, 60b), the horn/damper fitting (64), and the upper and lower spacer plates (90a, 90b) for accepting first and second fastening members (100, 110). The first fastening members (100) are disposed through the first set of aligned apertures (102) for mechanically coupling the clevis arms (60a, 60b), the horn/damper fitting (64), and the spacer plates (90a, 90b) in combination. The second fastening members (110) are disposed through the mounting apertures (29) of the rotor assembly yoke (24) and the second set of aligned apertures (112) for mechanically coupling the rotor assembly yoke (64) and the spacer plates (90a, 90b) in combination.

9 Claims, 6 Drawing Sheets

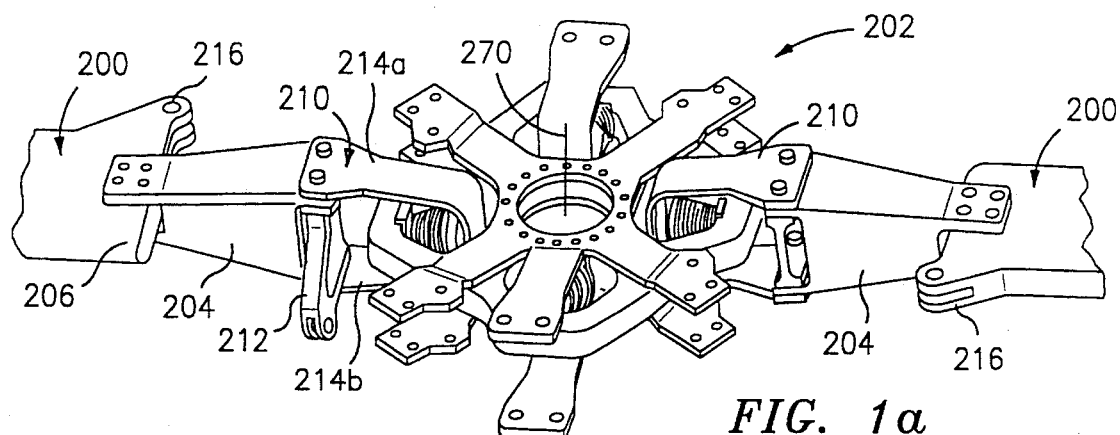
FIG. 1a (PRIOR ART)
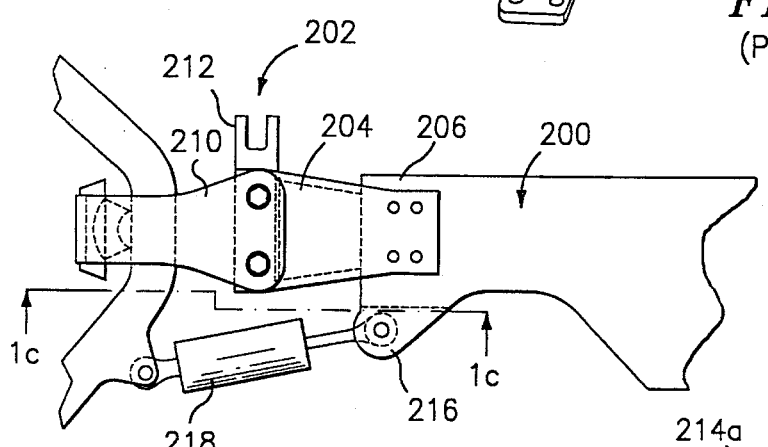
FIG. 1b (PRIOR ART)
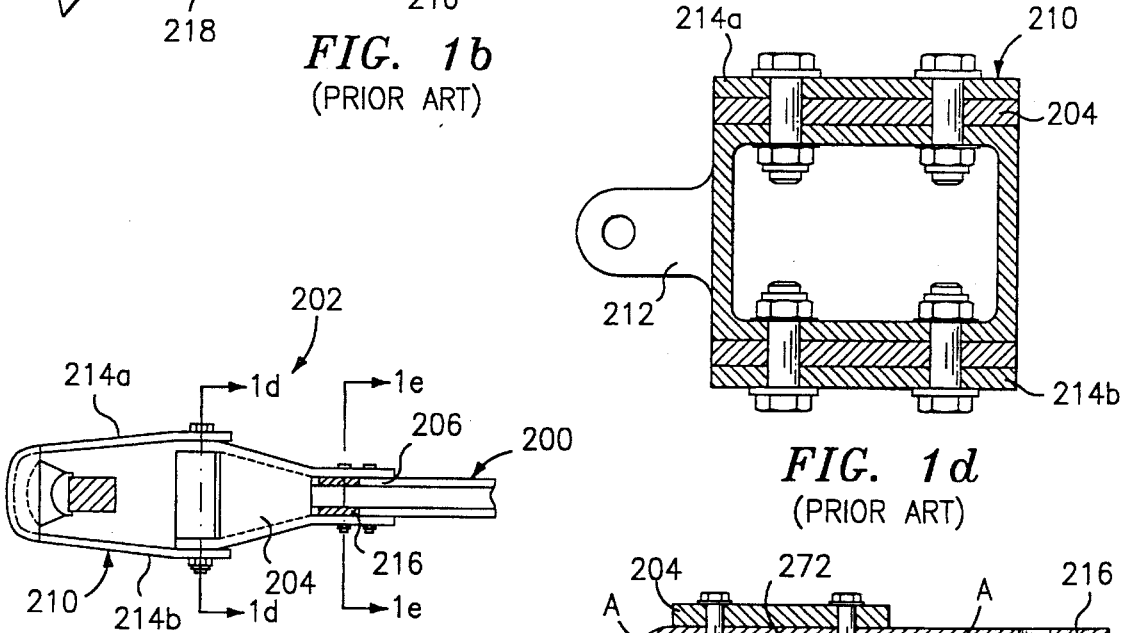
FIG. 1c (PRIOR ART)
FIG. 1d (PRIOR ART)
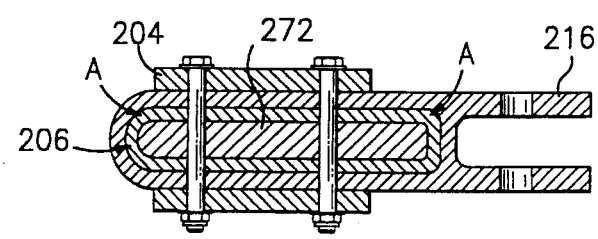
FIG. 1e (PRIOR ART)

HELICOPTER ROTOR BLADE MOUNTING ASSEMBLY

TECHNICAL FIELD

This invention relates to helicopter rotors and, more particularly, to articulated helicopter rotors, and more particularly, to a rotor blade mounting assembly therefor which reduces profile and induced drag losses, facilitates manufacturing and assembly, and is structurally efficient for reducing hub assembly weight.

BACKGROUND OF THE INVENTION

A helicopter rotor hub is the primary structural assembly for driving torque to each rotor blade, balancing centrifugal loads between opposing rotor blades and transferring lift loads to the aircraft fuselage. Common varieties of rotor hubs include articulated, hingeless and bearingless types wherein the rotor hub is characterized by the specific means for accommodating the multi-directional displacement of the rotor blades. For example, articulated rotor hubs typically employ one or more bearing elements to accommodate blade excursions whereas bearingless rotor hubs utilize flexible structures, commonly termed "flexbeams", to functionally replace the bearing elements of articulated rotor hubs.

Within the class or category of articulated rotors are those which include a rotor assembly yoke, one per rotor blade, which is driven by a central hub plate via a spherical multi-laminate elastomeric bearing. More specifically, the hub plate is generally circular in shape and includes a plurality of radially extending spokes and arcuate segments which structurally interconnect adjacent spokes. Furthermore, the spokes and arcuate segments define a plurality of apertures equal to the number of rotor blades. Each of the apertures accepts a rotor hub assembly yoke which is generally C-shaped and circumscribes, in looped fashion, the arcuate segments of the hub plate. Each hub assembly yoke includes a midsection, which extends though the respective aperture, and upper and lower radially extending arms which are disposed on either side of the hub plate and which mount to the respective rotor blade. The spherical elastomeric bearing is interposed between the midsection of each yoke and the respective arcuate segment to accommodate the loads and motions of the associated rotor blade.

Centrifugal forces are transferred to the hub plate as a compressive load in the elastomeric bearing, i.e., as the yoke bears against the outer bearing race of the elastomeric bearing. The spherical configuration of the elastomeric bearing accommodates the transmission of torque to the rotor blade, while furthermore accommodating in-plane (edgewise), out-of-plane (flapwise) and pitch change (feathering) motion of the rotor blade. U.S. Pat. No. 3,761,199, 4,235,570, 4,568,245, 4,797,064, and 4,930,983 illustrate articulated rotors of the type described above and are generally indicative of the current state-of-the art.

The size of the rotor assembly yoke, e.g., the height (spacing between the upper and lower radial arms) and width dimension, is determined by the operational motion envelop, i.e., specific operating requirements, of the rotor system. Accordingly, the flapwise, edgewise and feathering motion of the rotor system determines the clearance requirements between the radial arms and the hub plate. Generally, the motion envelope of, for example, a main rotor assembly prescribes that the height dimension of the rotor assembly yoke be relatively large, i.e., as compared to the height of the hub plate and/or the root end of the rotor blade, to accommodate the large excursions of the rotor blade. For main rotor applications, the height dimension of a typical rotor assembly yoke may exceed 6 inches (15.24 cm) as compared to that of the rotor blade root end which is typically less than 3 inches (7.62 cm).

To accommodate the height differential, various attempts have been made to effect a smooth geometric and structural transition from the rotor blade root end to the upper and lower radial arms of the rotor assembly yoke. FIGS. 1a–1e depict a prior art mounting arrangement for securing a helicopter rotor blade 200 to a rotor hub assembly 202 wherein a torque box member 204 is interposed between the root end 206 of the rotor blade 200 and a rotor assembly yoke 210. A first attachment fitting or pitch horn 212 is interposed between the upper and lower arms 214a, 214b of the rotor assembly yoke 210 and is articulately mounted to a pitch control rod (not shown) for imparting pitch motion to the rotor blade 200. A second attachment fitting or damper lug 216 is formed in combination with the root end 206 of the rotor blade 200, which damper lug 216 engages a damper assembly 218 (see FIG. 1b) for damping i.e., absorbing, the energy associated with self-excited edgewise motion of the rotor blade 200.

In FIGS. 2a–2e, a prior art mounting arrangement of another variety is shown wherein the upper and lower arms 220a, 220b of a rotor assembly yoke 222 are disposed over an integral torque box/damper fitting 224 and, furthermore, are elongated to meet the root end 226 of a rotor blade 228. A damper lug 230 is integrally formed at an outboard end of the torque box/damper fitting 224 while a pitch horn fitting 232 is fastened to a side wall thereof for imparting pitch motion to the rotor blade 228. The torque box/damper fitting 224 is affixed to the yoke arms 220a, 220b at inboard and outboard locations via first and second fastening bolts 236 and 238, respectively and forms an open-end 242 (see FIG. 2a) for accepting the root end of the rotor blade.

FIGS. 3a–3e depict yet another prior art mounting arrangement wherein the root end 250 of a rotor blade 252 is enlarged or expanded to meet the upper and lower radial arms 254a, 254b of a rotor assembly yoke 256. A horn/damper fitting 258 is disposed in combination with the rotor assembly yoke 256 and the rotor blade root end 250 such that the upper and lower transverse straps 260a, 260b of the horn/damper fitting 258 are interposed between the upper and lower radial arms 254a, 254b of the rotor assembly yoke 256 and the rotor blade root end 250 (best shown in FIG. 3d). The transverse straps 260a, 260b converge to form a pitch horn 262 and damper fitting 264 on opposing sides of the rotor blade 252.

The mounting arrangements of the prior art produce large aerodynamic drag penalties due to the high profile area produced by the torque box member 204 (FIG. 1a), the torque box/damper fitting 224 (FIG. 2a) or the enlarged rotor blade root end 250 (FIG. 3a). That is, the geometry and construction of the respective mounting arrangements produces increased profile drag area in regions of high velocity airflow, i.e., as compared to other rotor hub components which lie closer to the rotor system rotational axis 270.

Additionally, the prior art mounting arrangements require precise machining and/or manufacturing tolerances for ensuring proper fit and alignment of the assembled components and for abating the imposition of preinduced stresses in the assembled components. With regard to the latter, the prior art configurations are not forgiving of manufacturing deviations due to the structural rigidity, or stated conversely, the lack of compliance, of the assembled components, e.g., the torque box/damper fitting 224, horn/damper fitting 258, etc. Should manufacturing deviations be present, the mechanical clamping of the assembled components will produce high stress concentrations in areas A (see FIGS. 1e, 2e and 3d) where flexure is induced.

Other disadvantages of the prior art include weight penalties incurred through the use of large structural components, e.g., torque box 204, pitch horn 212, torque box/damper fitting 224 and horn/damper fitting 258, to facilitate mounting of a pitch control rod and/or damper assembly. Furthermore, each mounting arrangement requires the use of filler blocks 272, 274, 276 shown in FIGS. 1e, 2e, 3d, respectively, for supporting the rotor blade root end for mechanically clamping the assembly. Insofar as the filler blocks 272, 274 and 276 are essentially parasitic, i.e., have no utility other than to permit clamp-up of the mounting arrangement, additional weight penalties are incurred.

Moreover, prior art mounting arrangements, particularly those of the type shown in FIGS. 3a–3e, induce high bending moments in the fastening bolts. Referring to FIG. 3e, which shows an enlarged view of the bolted connection 278, it will be apparent by examination of the resultant vectors F that the distance therebetween, which determines the magnitude of the bending moment load, is increased by the thickness of the transverse straps 260a, 260b of the horn/damper fitting. Accordingly, a large bending moment is induced in the bolted connection 278 which necessitates a larger/heavier bolt or, conversely, requires more frequent replacement thereof due to the attendant reduced fatigue life. As a consequence of enlarging the bolt diameter, the overall width dimension of the rotor assembly yoke 256 must increase to maintain the necessary edge distance between the bolt receiving aperture 280 and a free edge 282 of the yoke 256. It will also be appreciated that as the width dimension increases, e.g., by the bolt pattern spacing and edge distance requirements, the height dimension will necessarily increase to accommodate the same pitch motion requirements.

A need therefore exists for a rotor hub assembly which reduces aerodynamic drag, facilitates manufacturing and assembly and is structurally efficient for reducing rotor assembly weight.

SUMMARY OF THE INVENTION

It is an object of the present invention to provide an improved mounting assembly for mechanically interconnecting a helicopter rotor blade to a rotor hub assembly and for mechanically interconnecting the rotor blade to a pitch control input assembly and a damper assembly which mounting assembly reduces aerodynamic drag.

It is another object of the present invention to provide an improved mounting assembly which facilitates manufacture and assembly thereof.

It is yet a further object of the present invention to provide an improved mounting assembly which is structurally efficient for reducing rotor assembly weight.

These and other objects of the invention are acheived by a mounting assembly for mechanically interconnecting a helicopter rotor blade to a rotor hub assembly and for mechanically interconnecting the rotor blade to a damper assembly and a pitch control input assembly. The rotor hub assembly includes a hub plate having a plurality of radial spokes and an arcuate segment for structurally interconnecting adjacent radial spokes wherein two adjacent radial spokes and an arcuate segment define a hub plate aperture for accepting a rotor assembly yoke. The rotor assembly yoke includes a medial portion and upper and lower arms projecting radially outboard thereof to form a generally C-shaped configuration. The rotor assembly yoke is, furthermore, disposed in the hub plate aperture so that the upper and lower arms are disposed above and below the arcuate segment and extend radially outboard thereof. Each of the upper and lower arms of the rotor assembly yoke includes a set of mounting apertures formed through the proximal end thereof. A bearing assembly mounts the rotor assembly yoke to the hub plate and is operative to drive torque from the hub plate to the rotor assembly yoke, and, furthermore, is operative to accommodate the multi-directional displacement of the rotor blade.

The mounting assembly includes upper and lower clevis arms formed at the root end portion of the rotor blade, a horn/damper fitting interposed between the upper and lower clevis arms, and upper and lower spacer plates disposed between the clevis arms and the radially extending arms of the rotor assembly yoke. The horn/damper fitting includes first and second end portions which are adapted for mounting to the damper assembly and the pitch control input assembly.

First and second sets of aligned apertures are formed in the upper and lower clevis arms, the horn/damper fitting, and the upper and lower spacer plates for accepting first and second fastening members. The first fastening members are disposed through the first set of aligned apertures for mechanically coupling the clevis arms, the horn/damper fitting, and the spacer plates in combination. The second fastening members are disposed through the mounting apertures of the rotor assembly yoke and the second set of aligned apertures for mechanically coupling the rotor assembly yoke and the spacer plates in combination.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIG. 1a depicts a perspective view of a prior art rotor assembly which illustrates a mounting arrangement for securing a helicopter rotor blade to a rotor hub assembly;

FIG. 1b depicts a partial plan view of the mounting arrangement shown in FIG. 1a;

FIG. 1c depicts a partial cross-sectional view taken substantially along line 1c—1c of FIG. 1b;

FIGS. 1d and 1e depict cross-sectional views taken substantially along lines 1d—1d and 1e—1e, respectively, of FIG. 1c;

FIG. 2b depicts a partial plan view of the mounting arrangement shown in FIG. 2a;

FIG. 3b depicts a partial plan view of the mounting arrangement shown in FIG. 3a;

BEST MODE FOR CARRYING OUT THE INVENTION

Figure 2A:
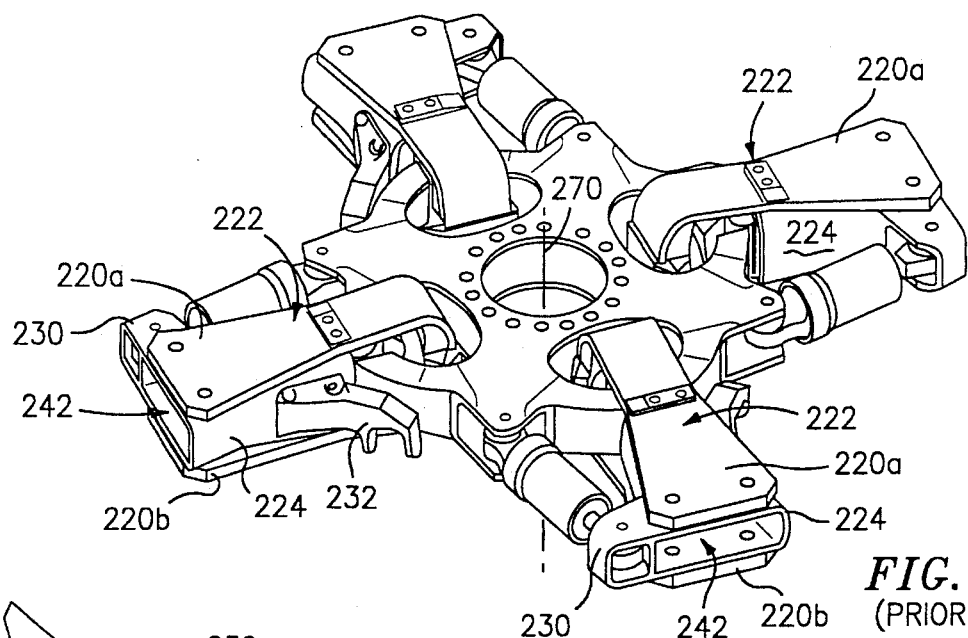
FIG. 2a depicts a perspective view of another prior art rotor assembly including a mounting arrangement for securing a helicopter rotor blade to a rotor hub assembly.
Figure 2B:
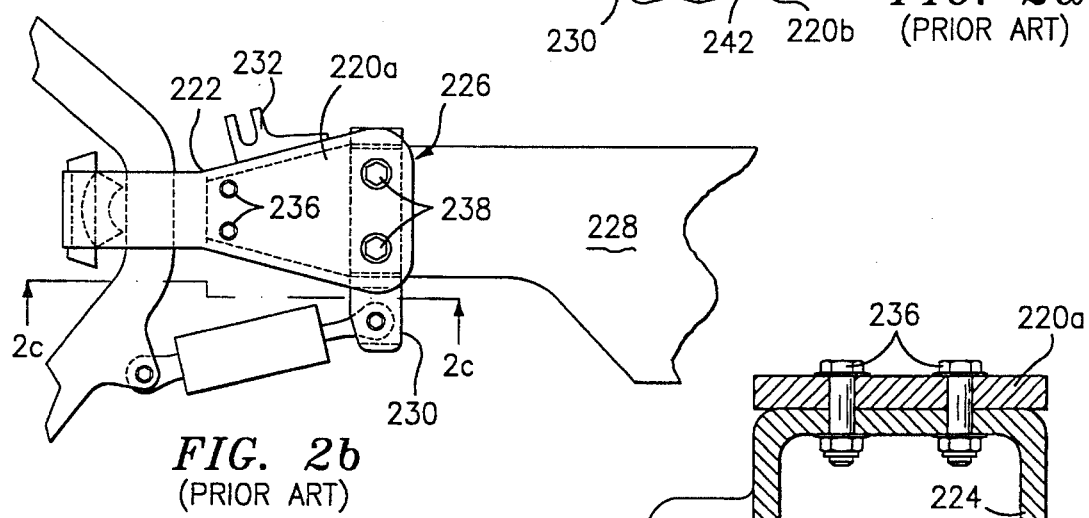
Figure 2D:
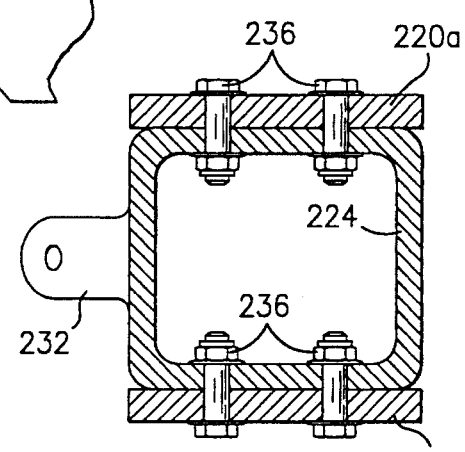
FIGS. 2d and 2e depict cross-sectional views taken substantially along lines 2d—2d and 2e—2e, respectively, of FIG. 2c.
Figure 2C:
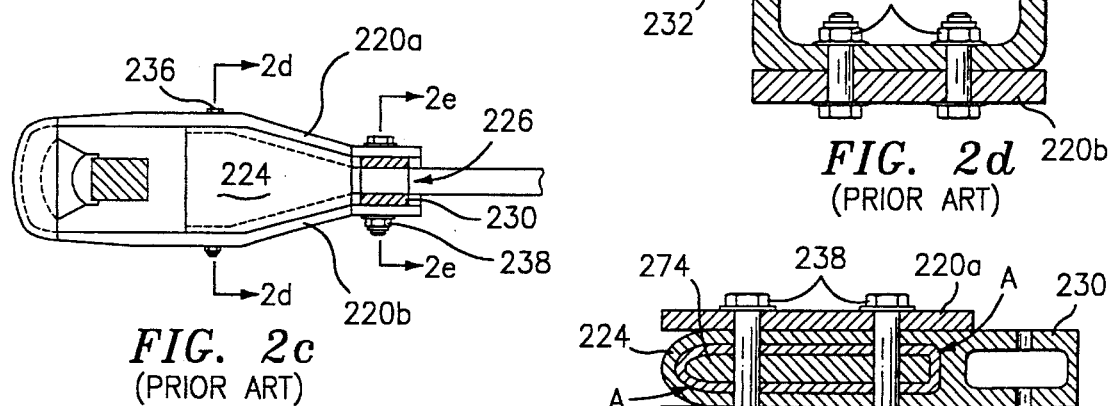
FIG. 2c depicts a partial cross-sectional view taken substantially along line 2c—2c of FIG. 2b.
Figure 2E:
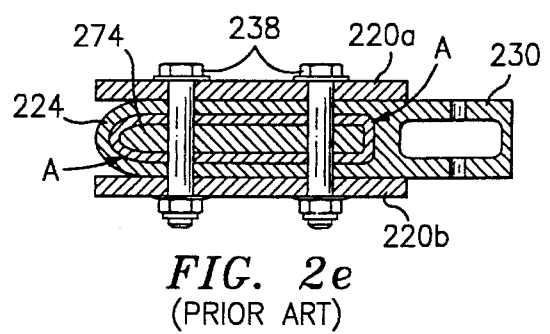
Figure 3A:
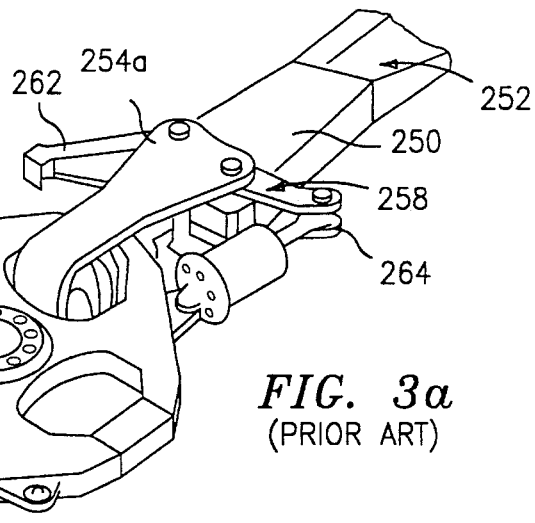
FIG. 3a depicts a perspective view of yet another prior art rotor assembly including a mounting arrangement for securing a helicopter rotor blade to a rotor hub assembly.
Figure 3B:
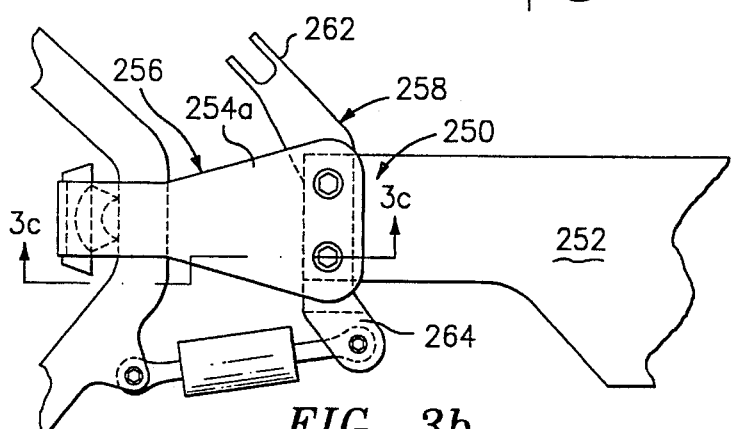
Figure 3D:
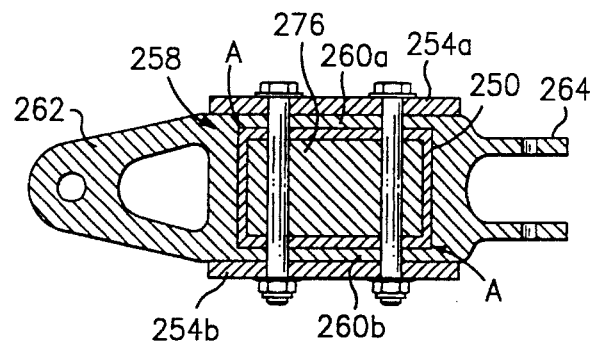
FIGS. 3d depicts a partial cross-sectional view taken substantially along line 3d—3d of FIG. 3c.
Figure 3C:
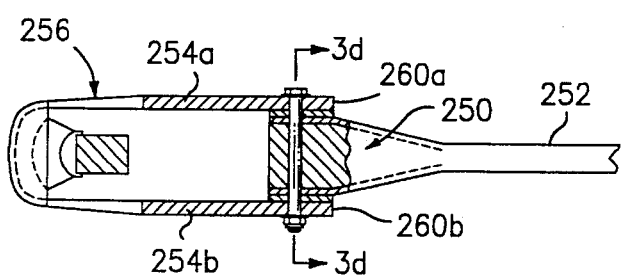
FIG. 3c depicts a cross-sectional view taken substantially along line 3c—3c of FIG. 3b.
Figure 3E:
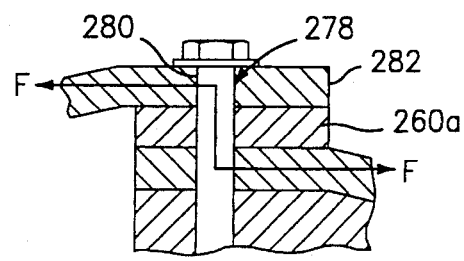
FIG. 3e depicts an enlarged, broken away view of the bolted connection shown in FIG. 3d.
Figure 4:
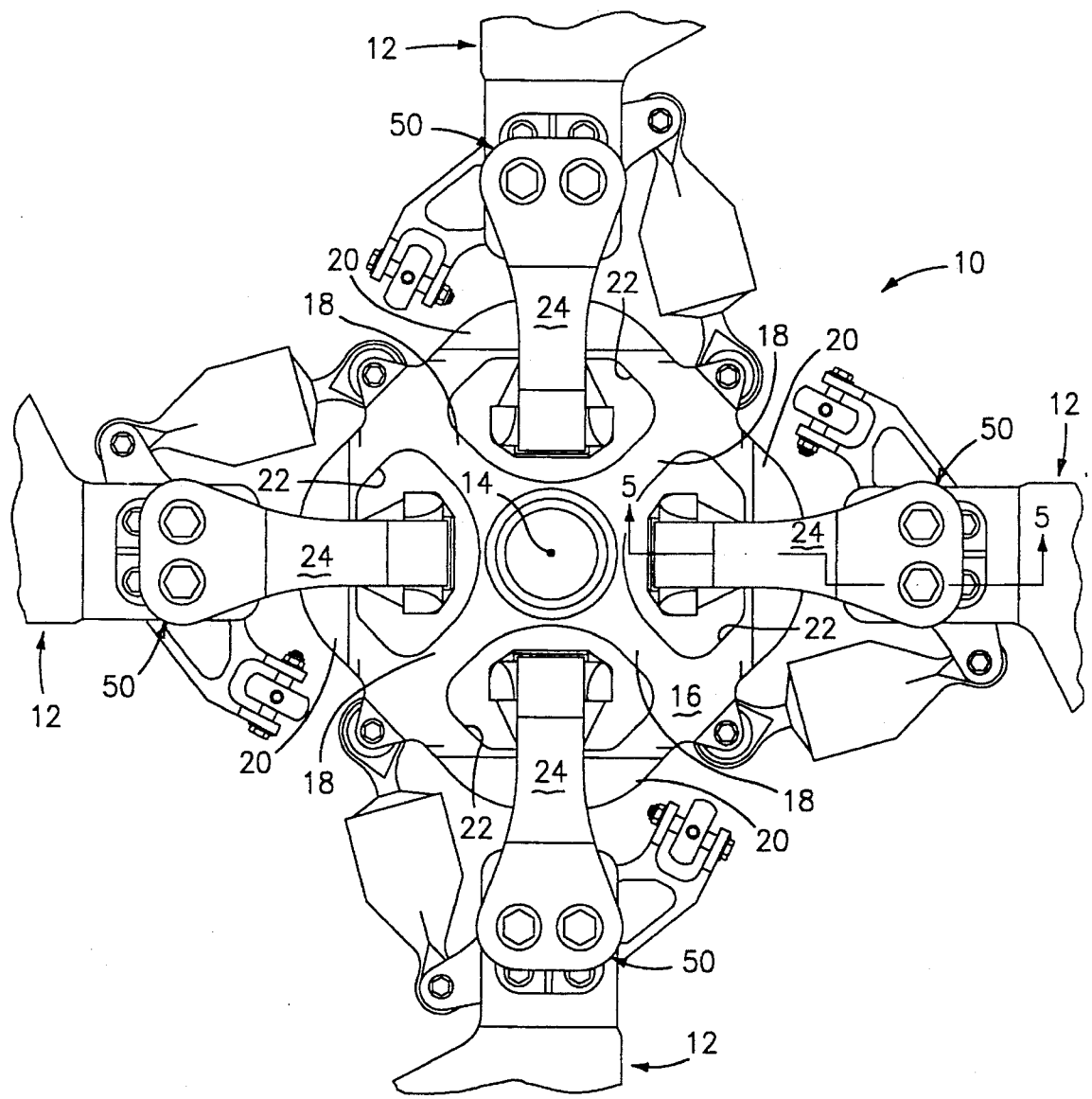
FIG. 4 depicts a plan view of an articulated rotor assembly employing the mounting assembly according to the present invention.

Referring now to the drawings wherein like reference characters identify corresponding or similar elements throughout the several views, FIG. 4 depicts a plan view of an articulated rotor hub assembly 10 for driving a plurality of rotor blades 12 about an axis of rotation 14. The rotor hub assembly 10 includes a hub plate 16 which is adapted for mounting to a rotor shaft (not shown) and which includes a plurality of radial spokes 18 and arcuate segments 20 for structurally interconnecting adjacent spokes 18. The radial spokes 18 and arcuate segments 20 define hub plate apertures 22 for accepting rotor assembly yokes 24 which are structurally interconnected to each rotor blade 12 by a mounting assembly 50 according to the present invention. The rotor assembly yokes 24 and the associated mounting assemblies 50 are identical for each rotor blade 12, hence, it will facilitate the discussion to describe a single mounting assembly and the interrelated components.

Figure 5:
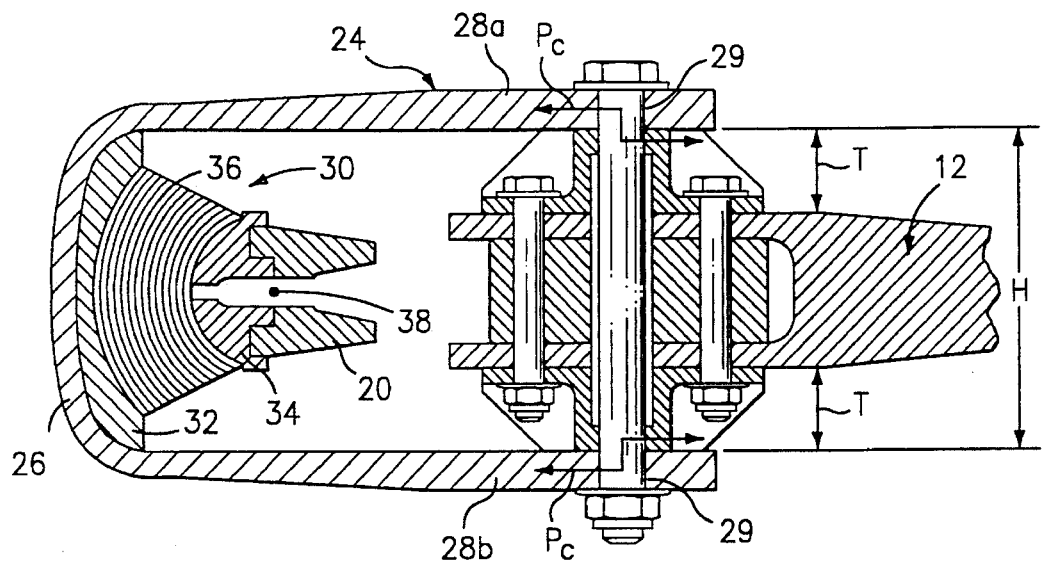
FIG. 5 is a cross-sectional view taken substantially along line 5—5 of FIG. 4.

In FIG. 5, the rotor assembly yoke 24 has a generally C-shaped configuration and includes a medial portion 26 which extends through the respective hub plate aperture, and upper and lower arms 28a, 28b which project radially outboard of the medial portion 26. The rotor assembly yoke 24, therefore, loops about the respective arcuate segment 20, so that the upper and lower arms 28a, 28b thereof are disposed above and below the arcuate segment 20 and extend radially outboard thereof. Furthermore, mounting apertures 29 are formed through the proximal ends of the upper and lower arms 28a, 28b which cooperate with the mounting assembly 50 to transfer the operational loads of the rotor system.

A bearing assembly 30 is interposed between and mounted to the arcuate segment 20 and the medial portion 26 of the rotor assembly yoke 24 to accommodate the multi-directional displacement of the rotor blade 12. In the described embodiment, an elastomeric bearing is shown having first and second bearing endplates 32, 34 mounting to the medial portion 26 of the rotor assembly yoke 24 and the arcuate segment 20, respectively. A plurality of spherically shaped resilient elastomeric laminates 36 are disposed between and bonded to the bearing endplates 32, 34 for accommodating flap, lead-lag, and pitch change motion through shear deformation of the elastomeric laminates 36 about a bearing focal point 38. Furthermore, the elastomeric bearing assembly 30, drives torque to the rotor blade 12 by means of compressive loading through the elastomeric laminates 36.

Figure 6:
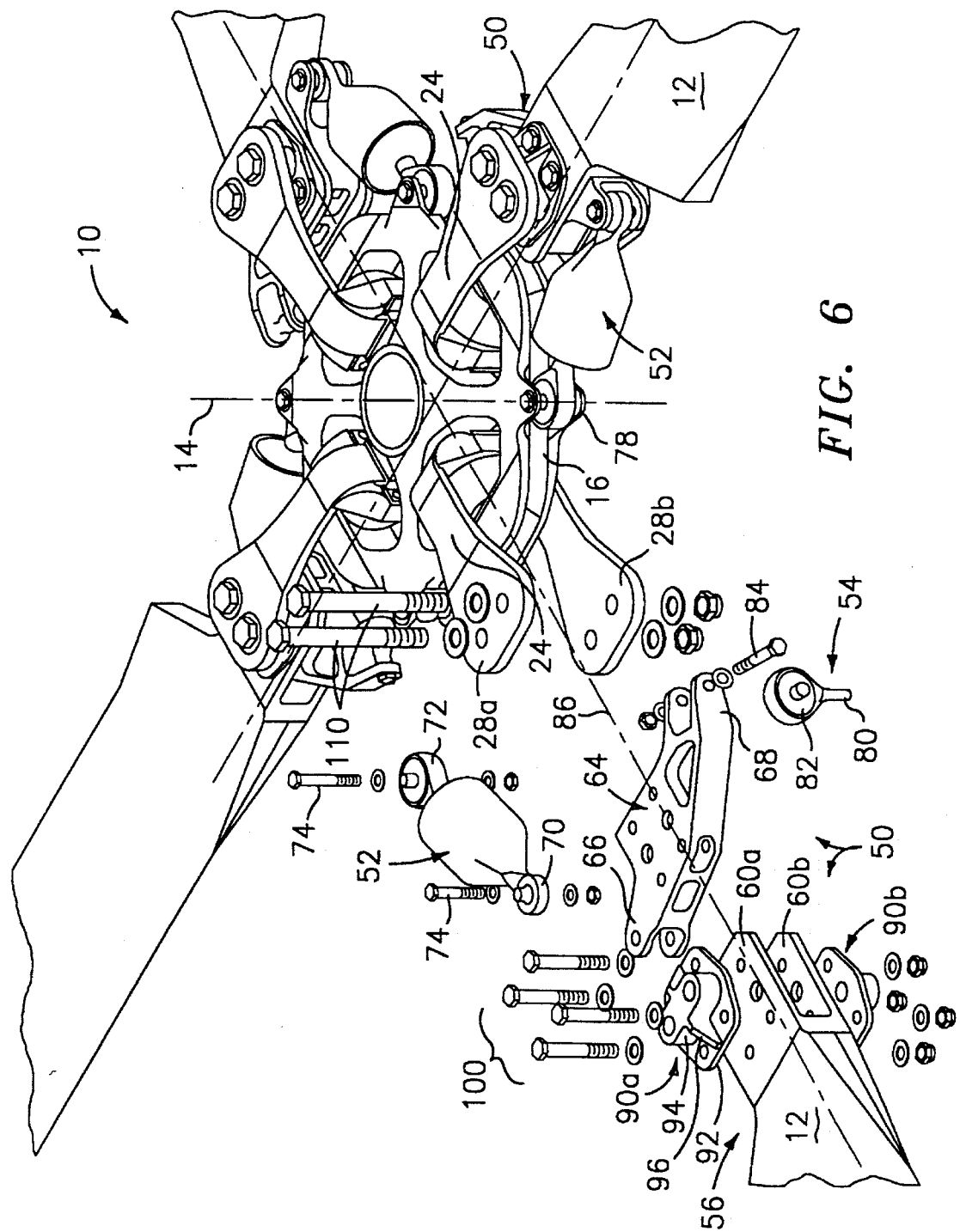
FIG. 6 depicts exploded and assembled perspective views of the mounting assembly according to the present invention; and, FIG. 7 is an enlarged view of FIG. 5 depicting the mounting assembly of the present invention in greater detail.

In FIG. 6, exploded and assembled views of the rotor hub assembly 10 is shown including the mounting assembly 50 according to the present invention. The mounting assembly 50 mechanically interconnects the rotor blade 12 to the rotor hub assembly 10 and, furthermore, mechanically interconnects the rotor blade 12 to a damper assembly 52 and a pitch control input assembly 54.

The root end 56 of the rotor blade 12 forms upper and lower clevis arms 60a, 60b which are preferably formed integrally with the upper and lower portions of the internal structural spar (not shown) of the rotor blade 12. That is, the structural spar, which may be elliptical, I-, D- or C-shaped, is initially fabricated oversized such that extraneous material may be removed from various sections thereof to form the upper and lower clevis arms 60a, 60b. This construction provides a structurally efficient load path for optimum transfer of rotor blade loads. Alternatively, the clevis arms 60a, 60b may be formed by a metallic fitting which is fastened or otherwise affixed to the inboard section of the rotor blade 12.

A horn/damper fitting 64 is interposed between the upper and lower clevis arms 60a, 60b and includes first and second end portions 66, and 68, respectively, which are configured for mounting to the damper assembly 52 and pitch control input assembly 54, respectively. The damper assembly 52 includes first and second articulate mounts 70 and 72, respectively, which mechanically interconnect the horn/damper fitting 64 to the hub plate 16. More, specifically, the first articulate mount 70 is disposed in combination with the first end portion 66 of the horn/damper fitting 64, via retention pins/bolts 74. The second articulate mount 72 is similarly connected to a lug fitting 78 (see assembled view) which is formed as an integral part of the hub plate 16 and is spatially positioned between adjacent rotor assembly yokes 24. The damper assembly 52 serves to dampen/absorb in-plane, self-excited resonant and other vibrations of the rotor blade 12 which are imposed by Coriolis and aerodynamic forces. Such damper assemblies are well-known in the art and are described in U.S. Pat. No. 4,105,365 and 4,695,226.

The pitch control input assembly 54 includes a pitch control rod 80 having a rod end bearing 82 which is disposed in combination with the second end portion 68 of the horn/damper fitting 64 via connecting pins/bolts 84. A conventional swashplate or umbrella rig (not shown) imparts axial displacement to the pitch control rod 80 which effects rotational displacement of the horn/damper fitting 64, and consequently, the rotor blade 12 about a pitch or feathering axis 86. The pitch control input assembly 54 controls the pitch or angle of attack of the rotor blade 12 to effect the magnitude of the thrust vector produced by the rotor system.

Upper and lower spacer plates 90a, 90b are interposed between the upper and lower clevis arms 60a, 60b of the rotor blade 12 and each of the radially extending arms 28a, 28b of the rotor assembly yoke 24. While the spacer plates 90a, 90b may be configured to form a simple rectangular block, each of the preferred spacer plates include a base portion 92, a raised medial portion 94 and rib members 96 structurally interconnecting the base and medial portions 92, 94. Such configuration provides structural efficiency for reducing the weight of the spacer plates 90a, 90b.

Figure 7:
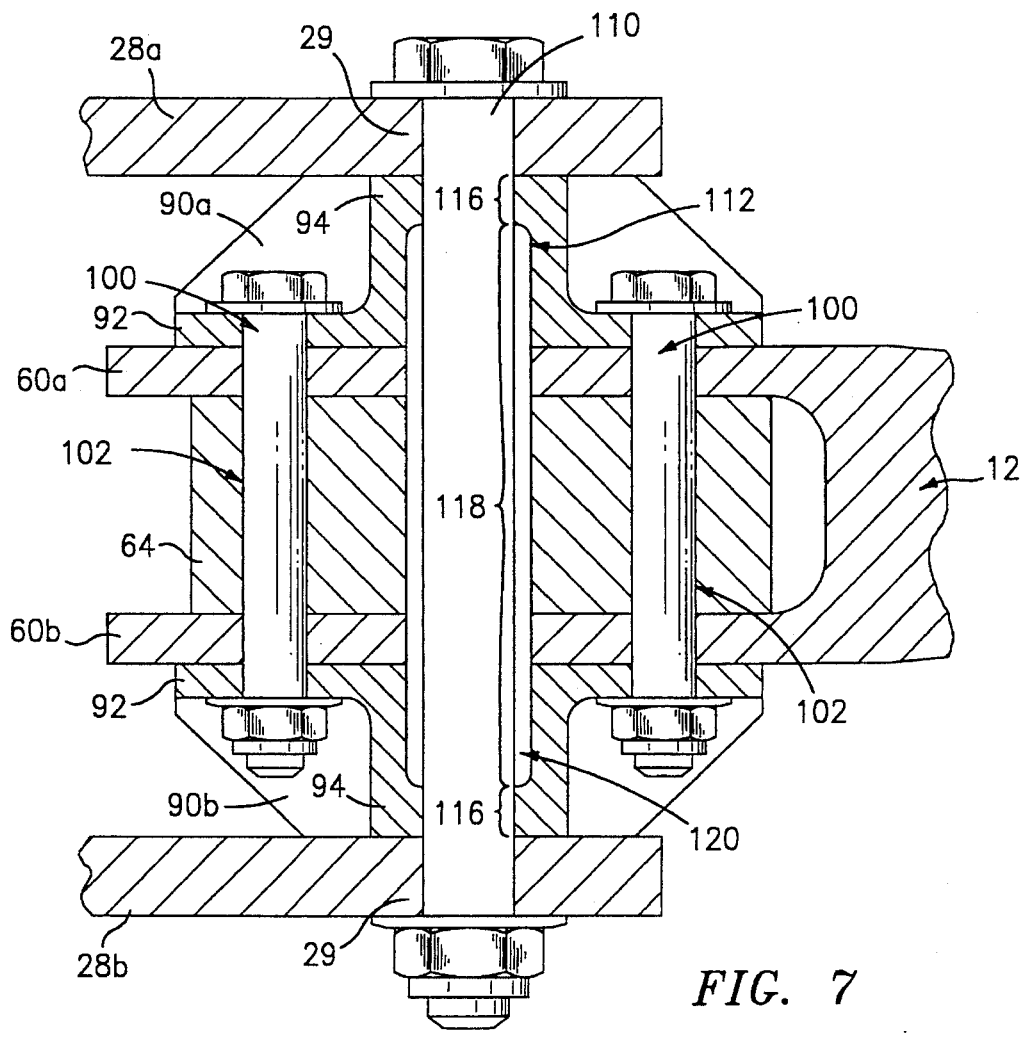

Referring to FIGS. 6–7, first fastening members 100 are disposed in combination with a first set of aligned apertures 102 (see FIG. 7) for mechanically coupling the spacer plates 90a, 90b and the horn/damper fitting 64 to the clevis arms 60a, 60b of the rotor blade 12. More specifically, the first set of aligned apertures 102 is formed in the base portion 92 of the upper and lower spacer plates 90a, 90b, the upper and lower clevis arms 60a, 60b, and the horn/damper fitting 64. The fastening members 100 transfer the pitch control and damping loads to the rotor blade 12 via the horn/damper fitting 64.

Second fastening members 110 are disposed in combination with the mounting apertures 29 of the rotor assembly yoke 24 and a second set of aligned apertures 112 (FIG. 7) for mechanically coupling the spacer plates 90a, 90b to the rotor assembly yoke 24. More specifically, the second set of aligned apertures 112 is formed in the raised medial portion 94 of the upper and lower spacer plates 90a, 90b, the upper and lower clevis arms 60a, 60b, and the horn/damper fitting 64.

The aligned apertures 112 vary in diameter, so as to form contact and non-contact regions, 116 and 118, respectively, with respect to the second fastening members 110. The contact regions 116 are areas wherein the aligned apertures 112 mate with/engage the second fastening members 110 so as to permit the transfer of primary rotor system loads, e.g., centrifugal and lift loads, from the spacer plates 90a, 90b to the radially extending arms 28a, 28b of the rotor assembly yoke 24. Preferably, the contact regions 116 are formed in the spacer plates 90a, 90b and, more preferably, in the medial portions 94 thereof which are proximal to the yoke arms 28a, 28b. The non-contact regions 118 are areas wherein the aligned apertures 112 are oversized relative to the diameter of the second fastening members 110 so as to form a small clearance gap 120 therebetween. The non-contact regions 118 preferably extend between the contact regions 116 in correspondence with the aligned apertures 112 of the clevis arms 60a, 60b and the horn/damper fitting 64. The clearance gap 120 prevents the direct transmission of operational loads, principally centrifugal loads, from the clevis arms 60a, 60b to the second fastening members 110. Accordingly, the primary operational loads of the rotor system are transferred via the spacer plates 90a, 90b and second fastening members 110 to the rotor assembly yoke 24, rather than from the clevis arms 60a, 60b and/or the horn/damper fitting 64 to the rotor assembly yoke 24. The benefits of this construction will be discussed in greater detail below when summarizing the advantages of the invention.

In the described embodiment, the first and second fastening members 100, 110 are connecting bolts having a head portion and a threaded end for accepting a bolt retaining nut; however, any pinned connection capable of reacting shear loads and/or tensile loads across the joints/interfaces will satisfy the load path requirements described above. Furthermore, at least two fastening members of each type, i.e., first and second fastening members 100, 110, are disposed through the respective apertures 102, 112, either in forward and aft, or side-by-side relation, to react in-plane moment loads as a couple thereacross.

The mounting assembly 50 of the present invention accommodates direct transfer of operational loads within a minimum design envelope. The vertical assemblage of the horn/damper fitting 64 clevis arms 60a, 60b, and the spacer plates 90a, 90b, occupies the total height dimension H defined by the arms 28a, 28b of the rotor assembly yoke 24 (see FIG. 5). Preferably the spacer plates 90a, 90b define a combined thickness dimension T which occupies at least about 35% of the total height dimension H. Accordingly, the mounting assembly 50 permits the rotor blade 12 to maintain a minimum thickness profile in areas immediately outboard of the rotor assembly yoke 24, thereby reducing profile drag in areas of high velocity airflow.

Additionally, the upper and lower arms 28a, 28b of the rotor assembly yoke 24 and the clevis arms 60a, 60b of the rotor blade 12, are sufficiently compliant so as to facilitate assembly of the horn/damper fitting 64 and the upper and lower spacer plates 90a, 90b therebetween. The inherent out-of-plane flexibility of the yoke and clevis arms 28a, 28b, 60a, 60b, permits mechanical clamping of the assembled components without introducing high stress concentrations in the mounting assembly 50. Accordingly, manufacturing tolerances may be relaxed and, consequently, manufacturing costs reduced. Additional fiscal savings may be realized when utilizing with the teachings of the present invention insofar as the horn/damper fitting 64 and spacer plates 90a, 90b may be fabricated utilizing a low cost metal casting or machining process. This construction eliminates the high cost of composite material fabrication associated with manufacture of the intermediate torque box 204 or the torque box/damper fitting 224 of the prior art.

Structural efficiency is also achieved by minimizing the bending moments in the second fastening members 110. To reduce bending moment loads, the contact region 116 is disposed over a relatively short length and proximal to the upper and lower arms 28a, 28b of the rotor assembly yoke 24. This will be apparent by examining the resultant force couple $P_c$, produced by the mounting assembly 50 wherein the bending moment is a function of the thickness/length of the yoke mounting aperture 29 and the contact region 116. More specifically, the bending moment M is calculated by equation (1) below:

$$M = P_c(t_{ma}/4 + t_{cr}/4) \qquad \text{eq (1)}$$

wherein $P_c$ is the shear load through the fastening member 110, $t_{ma}$ is the thickness of the mounting aperture 29 and $t_{cr}$ is the thickness of the contact region 116. By reducing the bending moments in the second fastening members 110, the diameter thereof may be reduced. Consequently, the requisite edge distance from a free edge of the rotor assembly yoke 24 to the mounting apertures 29 thereof may be reduced, thereby reducing the overall width and/or height dimension of the rotor assembly yoke.

It will be appreciated that the structural efficiency of the mounting assembly 50 provides weight savings; however, it should also be recognized that weight efficiency is improved by the optimal/functional use of each mounting assembly component. That is, all components are utilized to react or transfer blade assembly, pitch control or damper assembly loads. For example, the horn/damper fitting 64 serves in the capacity of imparting/reacting pitch control and damper assembly loads to/from the rotor blade 12 while furthermore serving as a filler block for reacting the clamping force imposed on the clevis arms 60a, 60b. Similarly, the spacer plates 90a, 90b transfer centrifugal and lift loads to the rotor assembly yoke 24 while serving as a filler block for reacting the clamping force imposed on the arms 28a, 28b of the rotor assembly yoke 24.

Although the invention has been shown and described with respect to exemplary embodiments thereof, it should be understood by those skilled in the art that the foregoing and other changes, omissions and additions may be made therein and thereto, without departing from the spirit and scope of the present invention.

What is claimed is:

1. A mounting assembly (50) for mechanically interconnecting a helicopter rotor blade (12) to a rotor hub assembly (10) and for mechanically interconnecting the rotor blade (12) to a damper assembly (52) and a pitch control input assembly (54), said rotor- hub assembly (10) including:

a hub plate (16) having a plurality of radial spokes (18) and an arcuate segment (20) structurally interconnecting adjacent radial spokes (18), two of said adjacent radial spokes (18) and an arcuate segment (20) defining a hub plate aperture (22);

a rotor assembly yoke (24) having a medial portion (26) and upper and lower arms (28a, 28b) projecting radially outboard thereof to form a generally C-shaped configuration, the rotor assembly yoke (24), furthermore, being disposed in the hub plate aperture (22) so that the upper and lower arms (28a, 28b) are disposed above and below the arcuate segment (20) and extend radially outboard thereof; each of the upper and lower arms (28a, 28b) having a set of mounting apertures (29) formed through the proximal end thereof; and, a bearing assembly (30) for mounting the rotor assembly yoke (24) to the hub plate (16) and operative to drive torque from the hub plate (16) to the rotor assembly yoke (24), and, furthermore, operative to accommodate the multi-directional displacement of the rotor blade (12);

wherein the mounting assembly (50), comprises:

the rotor blade (12) having a root end portion (56) forming upper and lower clevis arms (60a, 60b);

a horn/damper fitting (64) interposed disposed between said upper and lower clevis arms (60a, 60b), and having first and second end portions (66,68) configured for mounting to the damper assembly (52) and the pitch control input assembly (54), respectively;

upper and lower spacer plates (90a, 90b) interposed between said upper and lower clevis arms (60a, 60b) and said upper and lower radially extending arms (28a, 28b), respectively;

said upper and lower clevis arms (60a, 60b), said horn/damper fitting (64), and said upper and lower spacer plates (90a, 90b) having first and second sets of aligned apertures (102,112);

first fastening members (100) disposed through said first set of aligned apertures (102) for mechanically coupling said clevis arms (60a, 60b), said horn/damper fitting (64), and said spacer plates (90a, 90b) in combination;

second fastening members (110) disposed through the mounting apertures (29) of the rotor assembly yoke (24) and said second set of aligned apertures (112) for mechanically coupling the rotor assembly yoke (24) and said spacer plates (90a, 90b) in combination.

2. The mounting assembly (50) according to claim 1 wherein the mounting assembly (50) is operative to transfer primary operational loads between the rotor blade (12) and the rotor hub assembly (10) and wherein said second set of aligned apertures (112) of said spacer plates (90a, 90b) and said second fastening members (110) in combination define a contact region (116) for transmitting the primary operational loads across said spacer plates (90a, 90b) to the radially extending arms (28a, 28b) of said rotor assembly yoke (24).

3. The mounting assembly (50) according to claim 2 wherein said contact region (116) is proximal to the upper and lower arms (28a, 28b) of the rotor assembly yoke (24).

4. The mounting assembly (50) according to claim 1 wherein each of said spacer plates (90a, 90b) includes a base portion (92), a raised medial portion (94), and rib members (96) structurally interconnecting said base and raised medial portions (92, 94) and wherein said first set of aligned apertures (102) extend through said base portion (92) and said second set of aligned apertures (112) extend through said raised medial portion (94).

5. The mounting assembly (50) according to claim 1 wherein the upper and lower radially extending arms (28a, 28b) of the rotor assembly yoke (24) define a height dimension H and wherein said upper and lower spacer plates (90a, 90b) define a combined thickness dimension T equal to at least about 35% of said height dimension H.

6. A mounting assembly (50) for mechanically interconnecting a helicopter rotor blade (12) to a rotor hub assembly (10) and operative to transfer primary operational loads therebetween, said mounting assembly (50), furthermore, mechanically interconnecting the rotor blade (12) to a damper assembly (52) and a pitch control input assembly (54), said rotor hub assembly (10) including:

a hub plate (16) having a plurality of radial spokes (18) and an arcuate segment (20) structurally interconnecting adjacent radial spokes (18), two of said adjacent radial spokes (18) and an arcuate segment (20) defining a hub plate aperture (22);

a rotor assembly yoke (24) having a medial portion (26) and upper and lower arms (28a, 28b) projecting radially outboard thereof to form a generally C-shaped configuration, the rotor assembly yoke (24), furthermore, being disposed in the hub plate aperture (22) so that the upper and lower arms (28a, 28b) are disposed above and below the arcuate segment (20) and extend radially outboard thereof; each of the upper and lower arms (28a, 28b) having a set of mounting apertures (29) formed through the proximal end thereof; and, a bearing assembly (30) for mounting the rotor assembly yoke (24) to the hub plate (16) and operative to drive torque from the hub plate (16) to the rotor assembly yoke (24), and, furthermore, operative to accommodate the multi-directional displacement of the rotor blade (12);

wherein the mounting assembly (50), comprises:

the rotor blade (12) having a root end portion (56) forming upper and lower clevis arms (60a, 60b);

a horn/damper fitting (64) interposed disposed between said upper and lower clevis arms (60a, 60b), and having first and second end portions (66,68) configured for mounting to the damper assembly (52) and the pitch control input assembly (54), respectively;

upper and lower spacer plates (90a, 90b interposed between said upper and lower clevis arms (60a, 60b) and said upper and lower radially extending arms (28a, 28b), respectively;

said upper and lower clevis arms (60a, 60b), said horn/damper fitting (64), and said upper and lower spacer plates (90a, 90b) having first and second sets of aligned apertures (102,112);

first fastening members (100) disposed through said first set of aligned apertures (102) for mechanically coupling said clevis arms (60a, 60b), said horn/damper fitting (64), and said spacer plates (90a, 90b);

second fastening members (110) disposed through the mounting apertures (29) of the rotor assembly yoke (24) and said second set of aligned apertures (112) for mechanically coupling the rotor assembly yoke (24) and said spacer plates (90a, 90b)

said second set of aligned apertures (112) of said spacer plates (90*a*, 90*b*) and said second fastening members (110) in combination defining a contact region (116) for transmitting the primary operational loads across said spacer plates (90*a*, 90*b*) to the radially extending arms (28*a*, 28*b*) of said rotor assembly yoke (24).

7. The mounting assembly (50) according to claim 6 wherein said contact region (116) is proximal to the upper and lower arms (28*a*, 28*b*) of the rotor assembly yoke (24).

8. The mounting assembly (50) according to claim 6 wherein each of said spacer plates (90*a*, 90*b*) includes a base portion (92), a raised medial portion (94), and rib members (96) structurally interconnecting said base and raised medial portions (92, 94) and wherein said first set of aligned apertures (102) extend through said base portion (92) and said second set of aligned apertures (112) extend through said raised medial portion (94).

9. The mounting assembly (50) according to claim 6 wherein the upper and lower radially extending arms (28*a*, 28*b*) of the rotor assembly yoke (24) define a height dimension H and wherein said upper and lower spacer plates (90*a*, 90*b*) define a combined thickness dimension T equal to at least about 35% of said height dimension H.

\* \* \* \* \*